Patented June 2, 1925.

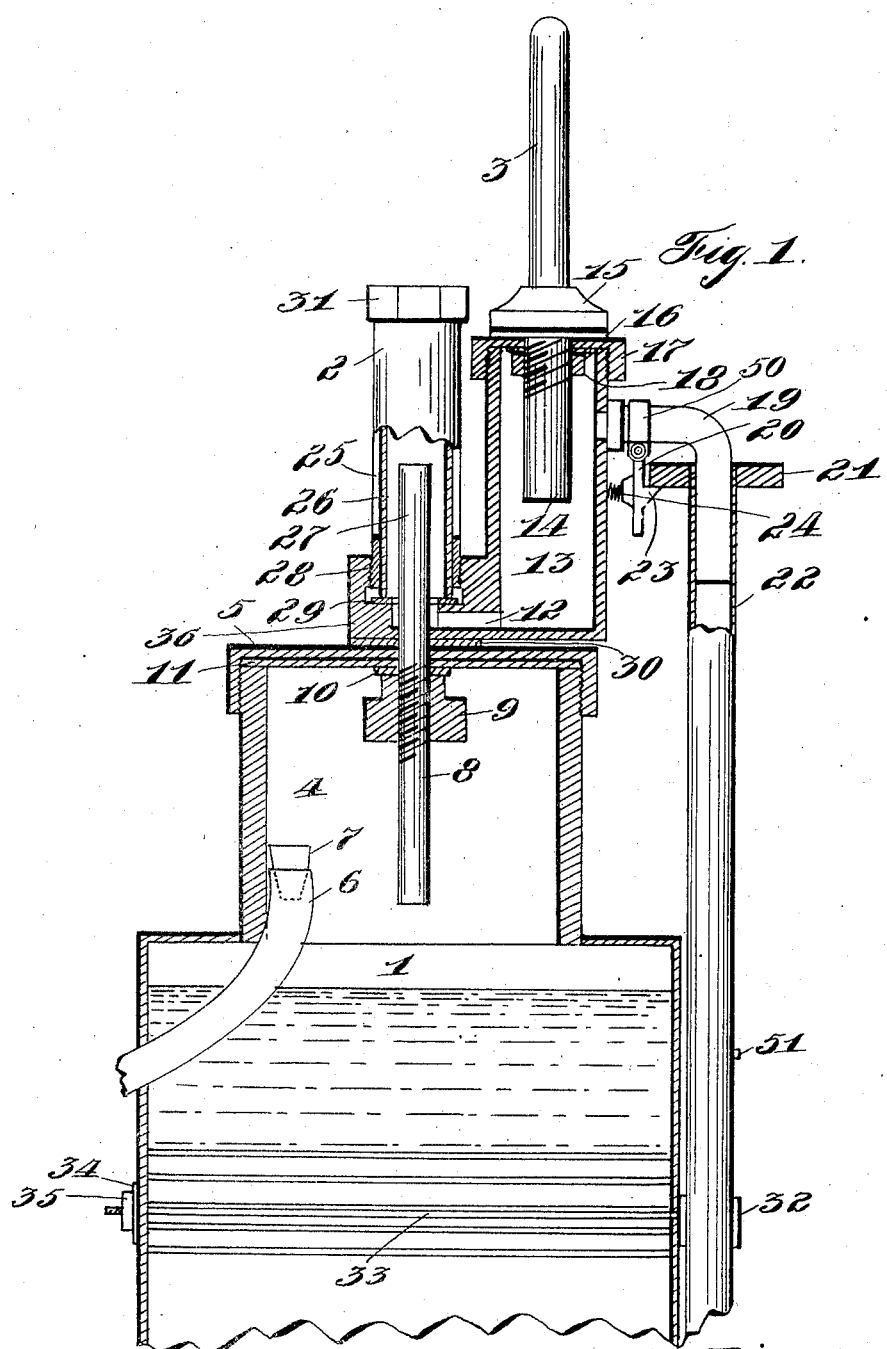

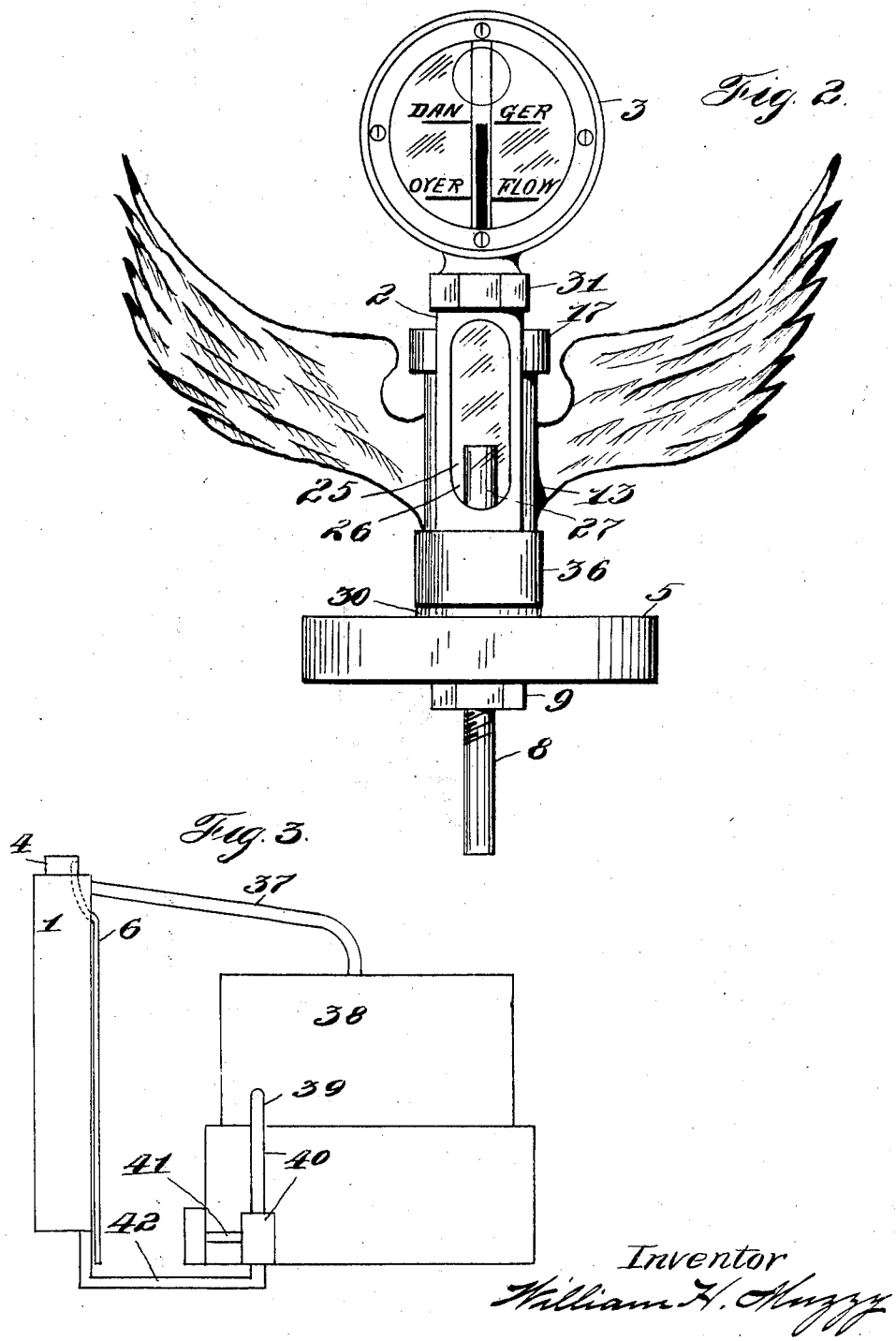

1,540,275

UNITED STATES PATENT OFFICE.

WILLIAM H. MUZZY, OF EVANSTON, ILLINOIS.

OVERFLOW AND HEAT INDICATOR FOR AUTOMOBILES.

Application filed March 24, 1923. Serial No. 627,507.

*To all whom it may concern:*

Be it known that I, WILLIAM H. MUZZY, a citizen of the United States, residing at Evanston, in the county of Cook and State of Illinois, have invented certain new and useful Improvements in Overflow and Heat Indicators for Automobiles, of which I declare the following to be a full, clear, and exact description.

This invention relates to improvements in radiator indicators and has more particular relation to improvements in indicators attachable to the removable filler cap of the radiator.

One of the principal objects of the invention is to provide an indicator that will inform the operator as to the overheating of the radiator, or the cooling fluid in the radiator and cooling system, the overflow of this cooling fluid from the system and the formation of steam in the cooling system.

Another object of the invention is to provide an indicator, attachable to the radiator cap, that will cause the overflow from the radiator to take place within the sight of the operator.

A still further object of the invention is to provide an indicator for bringing all discharge from the radiator, either water or steam, within sight of the operator.

A further object of the invention is to provide means for indicating the overheating or vaporizing of different fluids placed in the cooling system.

Another object of the invention is to provide means for isolating a temperature indicating device from the heat of the normally heated cooling fluid and bringing the indicating device into operation only when dangerous or abnormal heat conditions are present in the cooling system.

The invention also has other objects all of which will be hereinafter more particularly set forth and claimed.

In the accompanying drawings forming part of this specification:

Figure 1 represents a vertical longitudinal section through the devices embodying my invention applied to the top of an automobile radiator, the lower part of the latter being broken away;

Figure 2 represents a rear elevation of the devices applied to the filler cap of an automobile radiator, the detachable drain pipe being omitted, and Figure 3 represents a diagrammatic view of the water circulating system of an automobile, to which my improvements are applicable.

Heretofore, as far as applicant is aware, it has been the practice to place a heat indicator in the radiator cap so that the chamber containing the expansible element is projected into the air space present in the upper portion of the radiator. The result of this practice is a variable indication never twice the same. On cold days the thermometer indicates one thing and on warm days under the same engine conditions, the thermometer indication is different. The danger indication, when pure water is used in the cooling system, is at one point, whereas when alcohol is added in winter, the danger point is different, and each addition of alcohol changes this danger point to a new position. The operator does not know for sure at any time, just what the indication on the thermometer means as what might be danger at one time is not danger at another time and under different conditions. Applicant has endeavored in the present improvements to overcome this uncertain indication and provide a positive indication of the conditions with which the operator wishes to be kept informed.

He therefore uses the usual thermometer for indicating danger and removes this from the immediate influence of the normal heat of the cooling fluid but so locates it that when an abnormal heat or steam is generated, it will immediately come into action and give the danger signal.

Applicant also provides in the present invention a positive overflow indicator. The usual temperature indicator does not inform the operator as to overflow conditions and the water supply in the cooling system, is depleted, without the operator being aware of the fact.

In the aforesaid drawings 1 represents a radiator of an automobile, 2 the casing for the overflow indicator, 3 the heat indicator, 4 the filler standard of the radiator and 5 the radiator filler cap. The water system shown in Figure 3 is of the usual type, the water circulating from the radiator through pipe 42 to the pump 40 driven by shaft 41, through pipe 39, through water jackets 38 and finally through pipe 37 to the upper portion of the air space of the radiator. The usual overflow pipe 6 as shown projects up into the neck or standard 4. As applicant's invention is intended for use principally on cars already in use it is necessary to plug the upper end of the usual overflow 6 with a cedar plug 7 which swells when wet. The pipe may of course be closed in any other suitable manner, such as soldering at its upper or lower end.

The usual cap 5 is provided with a soft washer 11 to form a water tight joint when the cap is placed in position on the neck 4. The entire device is secured to the cap so as to be removable with it, by a nut 9 which screws up on the pipe 8 against a water tight washer 10. The lower end of the pipe 8 projects down slightly below the normal overflow position of the pipe 6.

The upper end of the pipe 8 is fast in an angular casting 36 and when the nut 9 is tightened, this casting is drawn down on a water tight washer 30 mounted on the top of the cap 5.

The casting 36 is hollowed out and screw threaded as at 28 to receive the overflow casing 2, the latter being provided with a nut 31 at its upper end so that it may be screwed down tight to force the glass tube 26 within it, down on the water tight washer 29 and against a similar washer located at the upper end of the casing and between it and the upper edge of the glass tube. The tube 8 projects loosely through the washer 29 and up into the glass tube 26 so as to be plainly visible through the windows 25 formed in the casing 2.

The angular casting 36 is formed with a passageway 12 opening into a chamber 13 into which the thermometer element 14 projects.

When the water rises in the radiator 1 by being overheated, or forced up by steam pockets in the water jackets it enters the lower end of the pipe 8 and as the air is trapped in the upper part of the neck 4, the water will rise in the tube 8 and jet out of the portion 27 within the glass tube and in plain sight of the operator. The water will not rise very high in the glass tube as the air is trapped in the top of the tube and will tend to force the water down and out through the passage 12 into the chamber 13. The water rises in this chamber and surrounds the thermometer element 14 and immediately causes the thermometer to rise and indicate an overflow condition. This overflow condition is of course also visible to the operator, as it takes place in the glass tube 26. As the overflow takes place in spurts however, the thermometer calls his attention to the fact which might for the time have escaped his notice, but having once seen the thermometer at overflow, his attention is called to the glass tube and he soon sees the actual overflow. If he does not see this overflow with the thermometer indicating overflow, then he is informed that the thermometer is rising because of the presence of vapor alone because the water is too low to be forced up into the tube 8. If this condition is not remedied, the thermometer will soon rise to danger and past and indicate that steam under pressure is flowing through the chamber 13. The discharge from the chamber 13 is through the pipe 19 secured in its side wall near the upper end.

The vertical discharge pipe 22 slides freely over the lower end of the pipe 19 and is provided with a disk 21 by which it is raised and lowered. This disk when in its upper position engages a latch nose 23 of a pivoted latch 20 forced into latching position by a coil spring 24 mounted in a recess in the latch and engaging the side of the chamber 13. The latch 20 is pivoted on a band 50 fast on the pipe 19. The lower end of the pipe 22 projects below the radiator to discharge on the ground. The pipe is held slidably in position by a sleeve 32 carried by a rod 33 which projects through the radiator and is secured by a nut 35 and felt washer 34.

It will be seen from the above, that when it is desired to remove the cap 5 to place water in the radiator, the latch 20 is forced back and the disk 21 pushed down until pin 51 on tube 2 contacts with the sleeve 32. The cap may now be freely rotated to unscrew it from the radiator. When the cap is screwed back into position again the disk 21 is simply snapped up again to the position shown in Figure 1.

It will be seen that the overflow from the chamber 13 is at a point higher than the top of the tube 8 but this does not result, as might be supposed, in the glass tube 26 filling with water when an overflow takes place. When the water first starts to overflow it will fall from the upper end 27 of the tube and fill the passage 12 and the lower portion of the chamber 13. The air is now trapped in the upper part of the glass tube 26 and any more water forced into the tube will create a tube pressure which will cause the water to rise in the chamber 13 and finally overflow from pipe 19. This keeps the upper end of the tube 8 clear of water so that the jet of water may be seen.

This is the normal operation of the device, but should a condition arise with a sudden pressure of steam present, then the sudden spurt of water under pressure from the pipe 27 will force most of the air out of the glass tube and fill it with water. As the pressure in the radiator decreases the water in the upper part of the glass tube will feed back into the radiator again and the water in the lower part of the glass tube will feed out of the tube into the chamber 13 because of the light pressure coming from the tube 8 from the radiator. Water falling through the tube 22 will have a slight siphon action to draw water out of the tube 26.

From the foregoing description it will be seen that with the present devices applicant has provided an instrument which will indicate to the operator of the machine the following conditions:

1. The overflow of water because of overheating.
2. The formation of steam without the overflow of water a very dangerous condition needing immediate attention.
3. The overflow of alcohol and water because of overheating.
4. The formation of gas from an alcohol mixture.
5. A positive indication of either overflow or the formation of steam or gas (no calculating on a scale).
6. Sight indication of the overflowing water itself.
7. A thermometer which acts only when danger is present.

Applicant has taken advantage of the fact that in most heat engines in use at the present time, the water cooling system is so arranged (see Figure 3) that the formation of steam or gas in the engine water jackets will cause a rise of water in the radiator by driving the water from the water jackets and from the connecting pipes. When the water level falls so low that the steam may escape from the water jackets through the pipe 37 to the radiator, without forcing water before it into the radiator, then a serious point has been reached. This condition is immediately indicated on applicant's improved instrument.

It will be seen that the present invention may be applied to all water cooled machines now in use in the same manner that the so called motor meter is now applied and that in such cases as the owner already has a motor meter, this latter may be applied to the chamber 13 just as it was then applied to the radiator cap.

The present invention is an improvement on applicant's invention covered by his co-pending application No. 532,368, filed Jan. 28, 1922, water and vapor indicators for automobiles.

In applying the motor meter 3 to the chamber 13, the cap nut 17 is first removed and the part 14 of the motor meter passed through the aperture in the cap and secured in position by a nut 18; the base 15 being drawn down tight upon a water tight washer 16. Any motor meter may be applied to the chamber 13 in this manner.

It will be understood that the present invention may be used without attaching it to the radiator cap, as for instance on the dash board of the machine within sight of the operator and connecting it to the radiator by a pipe which connects with the upper part of the radiator.

Having thus described my invention what I claim as new and desire to secure by Letters Patent is:

1. In an automobile the combination with an engine and its water cooling system including a radiator, of a closure cap for the filling opening of the radiator, an overflow device for the radiator mounted on the cap to cause the overflow to take place on a plane higher than the cap, and a heat indicator located to be influenced by the overflow alone.

2. In an automobile the combination with an engine and its water cooling system including a radiator, of an overflow pipe for the radiator, and a heat indicator located to be influenced by the overflow alone.

3. In an automobile the combination with an engine and its water cooling system including a radiator, of a closure cap for the filling opening of the radiator, a glass chamber mounted on the cap, a pipe projecting from the interior of the radiator into the glass chamber and acting as an overflow for the radiator, a motor meter mounted in connection with and under the influence of the overflow, and a detachable overflow pipe connected to the glass chamber.

4. In an automobile the combination with an engine and its water cooling system including a radiator, a visible overflow device connected to the radiator, and a heat indicator past which the overflow must pass.

In testimony whereof I affix my signature in the presence of a witness.

WILLIAM H. MUZZY.

Witness:
    MARY ISABELLE MUZZY.